US012627407B2

(12) United States Patent
Zhong et al.

(10) Patent No.: US 12,627,407 B2
(45) Date of Patent: May 12, 2026

(54) WIRELESS COMMUNICATION APPARATUS, WIRELESS COMMUNICATION SYSTEM, AND WIRELESS COMMUNICATION METHOD

(71) Applicant: TOYOTA JIDOSHA KABUSHIKI KAISHA, Aichi-ken (JP)

(72) Inventors: Lei Zhong, Tokyo-to (JP); Xiao Shao, Kawasaki (JP); Ryokichi Onishi, Tokyo-to (JP); Jing Ma, Yokohama (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 300 days.

(21) Appl. No.: 18/484,385

(22) Filed: Oct. 10, 2023

(65) Prior Publication Data

US 2024/0121032 A1 Apr. 11, 2024

(30) Foreign Application Priority Data

Oct. 11, 2022 (JP) ................................. 2022-163349

(51) Int. Cl.
H04L 1/1607 (2023.01)
H04W 84/12 (2009.01)

(52) U.S. Cl.
CPC ........... H04L 1/1635 (2013.01); H04W 84/12 (2013.01)

(58) Field of Classification Search
CPC ... H04L 1/1635; H04L 1/1607; H04L 1/1867; H04W 84/12; H04W 24/02; H04W 24/10; H04W 4/40
See application file for complete search history.

(56) References Cited

U.S. PATENT DOCUMENTS

2005/0089002 A1* 4/2005 Shin ...................... H04W 28/18
370/338
2017/0195857 A1 7/2017 Sakai et al.
(Continued)

FOREIGN PATENT DOCUMENTS

WO 2016/002436 A1 1/2016
WO 2017183278 A1 10/2017
WO 2019159515 A1 8/2019

OTHER PUBLICATIONS

IEEE SA Standards Association, IEEE 802.11aa-2012, IEEE Standard for Information technology, URL: https://standards.ieee.org/IEEE/802.11aa/4359/, 8pp.
(Continued)

*Primary Examiner* — Jamal Javaid
(74) *Attorney, Agent, or Firm* — HAUPTMAN HAM, LLP

(57) ABSTRACT

A wireless communication apparatus for transmitting data to a plurality of terminals in conformity with a predetermined wireless communication standard, comprises a controller configured to execute: successively broadcast-transmitting a plurality of data blocks; broadcast-transmitting first notification data as a notification for causing a first terminal receiving at least a part of the plurality of data blocks to declare that there is an unsuccessfully received data block after completion of the transmission of the plurality of data blocks; and retransmitting, if second notification data indicating the unsuccessfully received data block is received as a response to the first notification data from one or more of the first terminal, the data block indicated by the second notification data.

17 Claims, 9 Drawing Sheets

(56) References Cited

U.S. PATENT DOCUMENTS

| | | | | |
|---|---|---|---|---|
| 2019/0116522 | A1* | 4/2019 | Sugaya | ............... H04W 28/065 |
| 2019/0123923 | A1* | 4/2019 | Belleschi | ................ H04W 4/40 |
| 2019/0342723 | A1 | 11/2019 | Sakai et al. | |
| 2021/0044410 | A1 | 2/2021 | Morioka | |

OTHER PUBLICATIONS

Liwen Chu et al., Multicast/Broadcast Communication With Acknowledge, IEEE 802.11-0803rl, IEEE, Jul. 24, 2008, https://mentor.ieee.org/802.11/dcn/08/11-08-0803-01-00aa-multicast-broadcast-communication-with-acknowledge.ppt, 26pp.
Kazuyuki Sakoda et al., Overall Protocol of UL MU BA for Multicast Transmission, IEEE 802.11-15/1043rl, IEEE, Sep. 14, 2015, https://mentor.ieee.org/802.11/dcn/15/11-15-1043-01-00ax-overall-protocol-of-ul-mu-ba-for-multicast-transmission.pptx, 27pp.

* cited by examiner

VEHICLE-MOUNTED APPARATUS 100

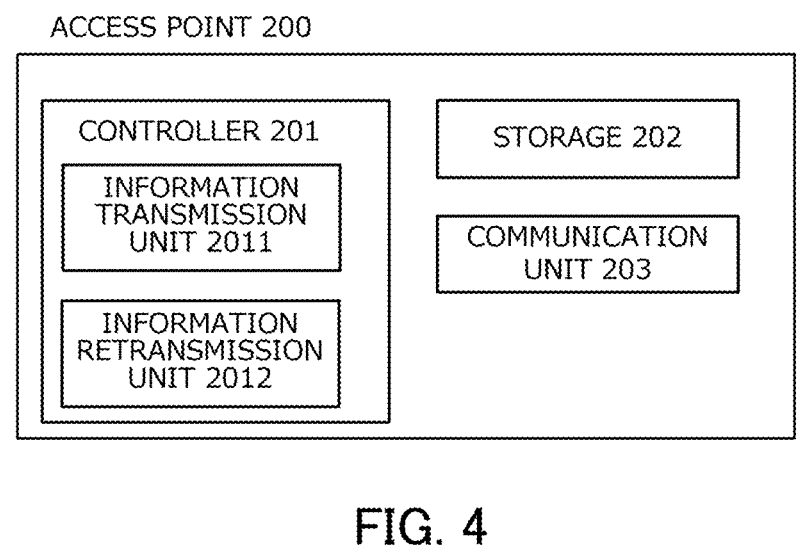

ACCESS POINT 200

CONTROLLER 201

INFORMATION
TRANSMISSION
UNIT 2011

INFORMATION
RETRANSMISSION
UNIT 2012

STORAGE 202

COMMUNICATION
UNIT 203

FIG. 4

WIRELESS COMMUNICATION APPARATUS, WIRELESS COMMUNICATION SYSTEM, AND WIRELESS COMMUNICATION METHOD

CROSS REFERENCE TO THE RELATED APPLICATION

This application claims the benefit of Japanese Patent Application No. 2022-163349, filed on Oct. 11, 2022, which is hereby incorporated by reference herein in its entirety.

BACKGROUND

Technical Field

The present disclosure relates to mobile communication.

Description of the Related Art

There is a technique in which a master apparatus broadcast-transmits information to a plurality of mobile terminals.

For example, a standard (IEEE802.11aa) for distributing a video frame is disclosed in "IEEE802.11aa,"<URL: https://standards.ieee.org/ieee/802.11aa/4359/>.

SUMMARY

The present disclosure has an object to enhance reliability of broadcast communication with low overhead.

The present disclosure in its one aspect provides a wireless communication apparatus for transmitting data to a plurality of terminals in conformity with a predetermined wireless communication standard, comprising a controller configured to execute: successively broadcast-transmitting a plurality of data blocks; broadcast-transmitting first notification data as a notification for causing a first terminal receiving at least a part of the plurality of data blocks to declare that there is an unsuccessfully received data block after completion of the transmission of the plurality of data blocks; and retransmitting, if second notification data indicating the unsuccessfully received data block is received as a response to the first notification data from one or more of the first terminal, the data block indicated by the second notification data.

The present disclosure in its another aspect provides a wireless communication system comprising a first wireless communication apparatus and a second wireless communication apparatus, wherein the first wireless communication apparatus executes receiving a plurality of data blocks which are broadcast-transmitted in conformity with a predetermined wireless communication standard by the second wireless communication apparatus, receiving, from the second wireless communication apparatus, first notification data as a notification for causing the first wireless communication apparatus to declare that there is an unsuccessfully received data block, the first notification data being broadcast-transmitted after completion of the transmission of the plurality of data blocks, and transmitting, if the first wireless communication apparatus unsuccessfully receives any of the plurality of data blocks, second notification data indicating the unsuccessfully received data block to the second wireless communication apparatus, in response to the first notification data, and the second wireless communication apparatus executes successively broadcast-transmitting the plurality of data blocks, broadcast-transmitting the first notification data after completion of the transmission of the plurality of data blocks, and retransmitting, if the second notification data is transmitted as a response to the first notification data from the first wireless communication apparatus, the data block indicated by the second notification data.

The present disclosure in its another aspect provides a wireless communication method to be performed by a first wireless communication apparatus and a second wireless communication apparatus, wherein the first wireless communication apparatus executes receiving a plurality of data blocks which are broadcast-transmitted in conformity with a predetermined wireless communication standard by the second wireless communication apparatus, receiving, from the second wireless communication apparatus, first notification data as a notification for causing the first wireless communication apparatus to declare that there is an unsuccessfully received data block, the first notification data being broadcast-transmitted after completion of the transmission of the plurality of data blocks, and transmitting, if the first wireless communication apparatus unsuccessfully receives any of the plurality of data blocks, second notification data indicating the unsuccessfully received data block to the second wireless communication apparatus, in response to the first notification data, and the second wireless communication apparatus executes successively broadcast-transmitting the plurality of data blocks, broadcast-transmitting the first notification data after completion of the transmission of the plurality of data blocks, and retransmitting, if the second notification data is transmitted as a response to the first notification data from the first wireless communication apparatus, the data block indicated by the second notification data.

Other aspects include a program for causing a computer to execute the above-described method or a computer-readable storage medium non-transitorily storing the program.

The present disclosure allows enhancement of reliability of broadcast communication with low overhead.

BRIEF DESCRIPTION OF THE DRAWINGS

FIG. 4 is a diagram illustrating constituent elements of an access point;

DESCRIPTION OF THE EMBODIMENTS

Figure 1:
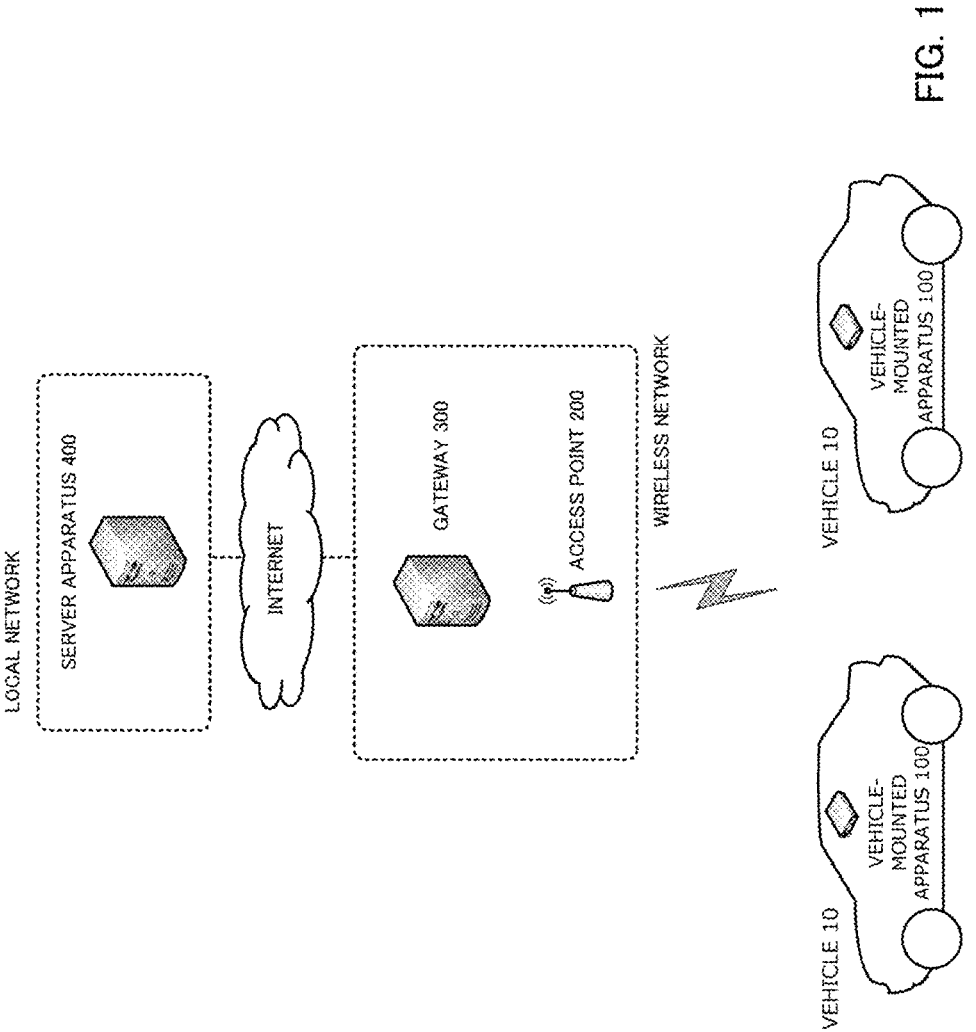
FIG. 1 is a schematic diagram of a communication system according to a first embodiment.

There is a technique in which a master apparatus broadcast-transmits data to a plurality of mobile terminals using wireless communication.

However, broadcast is unilateral transmission of data and does not guarantee that a plurality of terminals normally receives all data. There is also available a wireless communication standard employing, for example, a mechanism (BlockAck) for transmitting an Ack for each series of data blocks to notify a source of unsuccessful reception of successively transmitted data.

However, since all terminals included in a group transmit Acks in the above-described mechanism, the mechanism suffers from high overhead and poor utilization efficiency of a wireless channel.

A wireless communication apparatus according to the present disclosure solves the above-described problem.

A wireless communication apparatus according to a first aspect of the present disclosure is a wireless communication apparatus for transmitting data to a plurality of terminals in conformity with a predetermined wireless communication standard, including a controller configured to execute successively broadcast-transmitting a plurality of data blocks, broadcast-transmitting first notification data as a notification for causing a first terminal receiving at least a part of the plurality of data blocks to declare that there is an unsuccessfully received data block after completion of the transmission of the plurality of data blocks, and retransmitting, if second notification data indicating the unsuccessfully received data block is received as a response to the first notification data from one or more of the first terminal, the data block indicated by the second notification data.

The wireless communication apparatus is an apparatus which successively broadcasts a plurality of data blocks to the plurality of terminals in conformity with the predetermined wireless communication standard. For example, IEEE802.11 (IEEE802.11aa) can be adopted as the predetermined wireless communication standard.

The first notification data is data for causing a terminal receiving at least a part of the plurality of data blocks to declare that there is an unsuccessfully received data block. A terminal receiving the first notification data declares to that effect with the second notification data if there is an unsuccessfully received data block among the series of data blocks. The controller retransmits a target data block if the controller receives the second notification data.

With the above-described configuration, not all terminals but only a terminal unsuccessful in receiving data (which has missed taking data) returns a negative acknowledgment (the second notification data), and communication-related overhead can be reduced.

Note that the second notification data may include a sequence number of the unsuccessfully received data block of the plurality of data blocks. In this case, the wireless communication apparatus can retransmit only the unsuccessfully received data block.

The controller may broadcast-transmit a signal giving notice of initiation of the transmission before initiating the broadcast transmission of the plurality of data blocks.

In CSMA/CA, communication is initiated using backoff, and there is no mechanism by which a particular communication apparatus preferentially transmits a plurality of data blocks at a time. For this reason, a signal giving notice of initiation of transmission may be broadcasted before transmission of a plurality of data blocks, and a terminal receiving the signal may temporarily stop data transmission.

The signal may be, for example, one which requests stopping of data transmission until the first notification data is transmitted (i.e., until transmission of the series of data blocks is completed).

The above-described configuration allows the wireless communication apparatus to preferentially perform successive data transmission.

Specific embodiments of the present disclosure will be described below with reference to the drawings. A hardware configuration, a module configuration, a functional configuration, and the like described in each embodiment are not intended to limit the technical scope of the disclosure thereto unless otherwise described.

First Embodiment

An overview of a communication system according to a first embodiment will be described with reference to FIG. 1. The communication system according to the present embodiment is a system in which a server apparatus 400 generates data to be distributed to a plurality of vehicles 10 and broadcast-transmits the data to the plurality of vehicles 10 via a predetermined wireless network. The predetermined wireless network is, for example, a network to which the running vehicle 10 can connect via an access point 200 which is installed at the roadside.

The number of vehicles 10 (vehicle-mounted apparatuses 100) included in the system may be two or more.

The vehicle 10 is a connected car having a wireless communication function. The vehicle 10 can connect to one or more wireless networks via the access point 200 installed at the roadside and receive data which is distributed from the server apparatus 400. A plurality of wireless networks may be included in the illustrated communication system.

The server apparatus 400 is an apparatus which provides information to the vehicle 10 (the vehicle-mounted apparatus 100). The server apparatus 400 determines a wireless network through which data is to be distributed and broadcast-transmits data via the access point 200 that the wireless network has. With the broadcast transmission, the data is transmitted to all vehicles 10 (vehicle-mounted apparatuses 100) that are connected to the target wireless network.

The wireless network, to which the vehicles 10 are connected, and a local network in which the server apparatus 400 is arranged are connected to each other via a WAN, such as the Internet.

In the wireless network, the access point 200 that is to wirelessly communicate with the vehicle-mounted apparatus 100 and a gateway 300 serving as a gateway to the Internet are arranged. The access point 200 is an apparatus which provides wireless access to the wireless network.

The wireless network and the server apparatus 400 are connected to each other by the WAN (e.g., the Internet, typically). The wireless network may be a network using Wi-Fi® or the like or may be a mobile communication network using a cellular communication scheme. If a mobile communication network is used, the access point 200 is a base station.

Elements constituting the system will be described in detail.

The vehicle 10 is a connected car having a function of communication with an external network. The vehicle 10 is equipped with the vehicle-mounted apparatus 100.

The vehicle-mounted apparatus 100 is a computer for collecting information. In the present embodiment, the vehicle-mounted apparatus 100 has a function of providing information to an occupant of the vehicle 10 on the basis of data received from the server apparatus 400.

The vehicle-mounted apparatus 100 may be an apparatus (e.g., a car navigation apparatus) which provides information to an occupant of the vehicle 10 or may be an electronic control unit (ECU) which the vehicle 10 has. Alternatively, the vehicle-mounted apparatus 100 may be a data communication module (DCM) having a communication function.

The vehicle-mounted apparatus 100 can be constructed as a computer having a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory, and functions tailored to a predetermined purpose as will be described later can be implemented through execution of a program stored therein. Note that some or all of the functions may be implemented by a hardware circuit, such as an ASIC or an FPGA.

Figure 2:
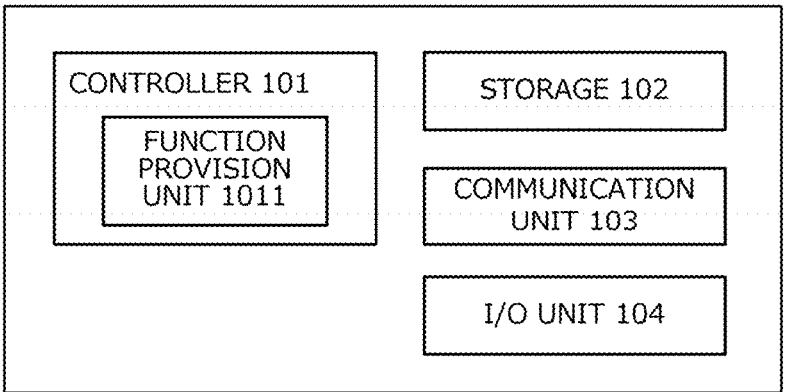
FIG. 2 is a diagram illustrating constituent elements of a vehicle-mounted apparatus.

FIG. 2 is a diagram illustrating a system configuration of the vehicle-mounted apparatus 100.

The vehicle-mounted apparatus 100 is configured to have a controller 101, a storage 102, a communication unit 103, and an I/O unit 104.

The controller 101 is an arithmetic unit which implements various types of functions of the vehicle-mounted apparatus 100 by executing a predetermined program. The controller 101 may be implemented by, for example, a CPU or the like.

The controller 101 is configured to have a function provision unit 1011 as a functional module. The functional module may be implemented through execution of a stored program by the CPU.

The function provision unit 1011 executes the various types of functions provided by the vehicle-mounted apparatus 100. Examples of a function to be provided by the vehicle-mounted apparatus 100 include the following ones.
Navigation Function This is a function of providing route navigation on the basis of map data provided by the server apparatus 400.
Traffic Information Acquisition Function This is a function of providing traffic information or controlling the vehicle 10 on the basis of information provided by the server apparatus 400. The traffic information may be information necessary for autonomous running or semi-autonomous running. For example, vehicle control at the time of passing through an intersection can be performed on the basis of data which is broadcast-transmitted at the intersection.

The above-described functions can be provided via, for example, the I/O unit 104 (a touch panel). The functions may be provided via the electronic control unit that the vehicle 10 has.

To provide the functions, the vehicle-mounted apparatus 100 may have a GPS antenna, a GPS module, or the like.

The function provision unit 1011 is configured to be capable of executing the above-described functions using data transmitted from the server apparatus 400.

The storage 102 is a memory device including a main memory and an auxiliary memory. An operating system (OS), various types of programs, various types of tables, and the like are stored in the auxiliary memory, and functions tailored to a predetermined purpose as will be described later can be implemented through loading of a program stored therein into the main memory and execution of the program.

The main memory may include a RAM (Random Access Memory) or a ROM (Read Only Memory). The auxiliary memory may include an EPROM (Erasable Programmable ROM) or a hard disk drive (HDD). The auxiliary memory may further include a removable medium, i.e., a removable recording medium.

The communication unit 103 is a wireless communication interface for connection of the vehicle-mounted apparatus 100 to the wireless network. The communication unit 103 is configured to be capable of communication with the wireless network by, for example, mobile communication or a wireless LAN, or in conformity with a communication standard, such as Bluetooth® or DSRC.

The I/O unit 104 is means for accepting an input manipulation performed by a user of the apparatus and presenting information. In the present embodiment, the I/O unit 104 is composed of one touch panel display. That is, the I/O unit 104 is composed of a liquid crystal display and control means therefor and a touch panel and control means therefor.

When the vehicle 10 (the vehicle-mounted apparatus 100) senses the access point 200 by receiving a beacon signal, the vehicle 10 establishes connection with the access point 200 and connects to the predetermined wireless network via the access point 200. The wireless network is configured to include the gateway 300 to the wide area network (the Internet), and the vehicle-mounted apparatus 100 is capable of communication with the server apparatus 400 via the gateway 300.

The server apparatus 400 will be described. The server apparatus 400 is an apparatus which provides information to a plurality of vehicle-mounted apparatuses 100.

The server apparatus 400 can be constructed as a computer having a processor, such as a CPU or a GPU, a main memory, such as a RAM or a ROM, and an auxiliary memory, such as an EPROM, a hard disk drive, or a removable medium. Note that the server apparatus 400 may be composed of a single computer or may be composed of a plurality of computers which collaborate with each other.

First, the server apparatus 400 determines a target wireless network through which data is to be broadcast-transmitted. The target wireless network, through which data is to be broadcast-transmitted, can be determined on the basis of, such as a geographical position.

Second, the server apparatus 400 generates data to be broadcast-transmitted to the vehicle-mounted apparatuses 100 connected to the target wireless network. In the present embodiment, the data to be broadcast-transmitted to the vehicle-mounted apparatuses 100 is a set of data composed of a plurality of data blocks.

Figure 3:
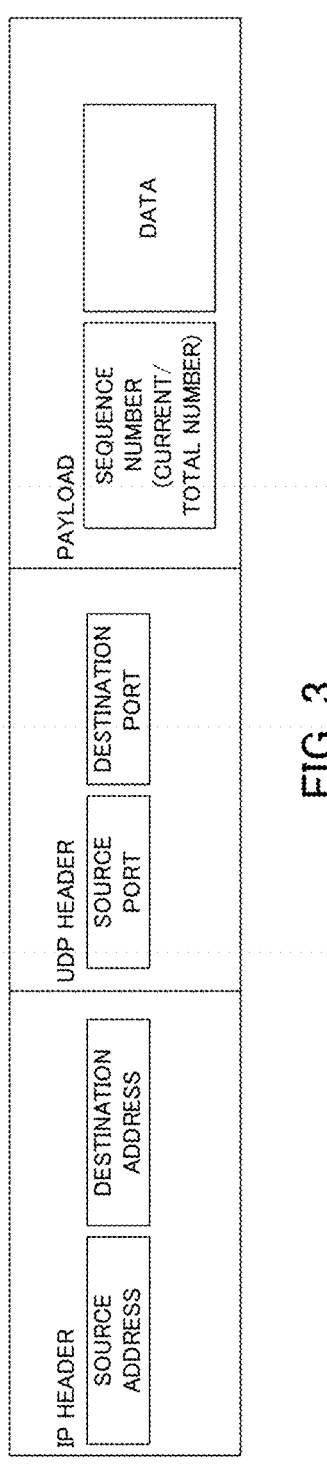
FIG. 3 is an example of an IP packet to be transmitted from a server apparatus.

FIG. 3 is an example of an IP packet to be generated by the server apparatus 400. In the present embodiment, the server apparatus 400 successively broadcast-transmits a plurality of such IP packets to the vehicle-mounted apparatuses 100 connected to the target wireless network via the access point 200. An IP packet to be transmitted includes a sequence number indicating a position in a data transmission order.

The IP packet is transmitted to the access point 200 via the gateway 300.

The access point 200 will be described. The access point 200 is an apparatus which broadcast-transmits data generated by the server apparatus 400 to the plurality of vehicle-mounted apparatuses 100. The access point 200 performs data retransmission control on the basis of interaction with the vehicle-mounted apparatuses 100.

FIG. 4 is a diagram illustrating a system configuration of the access point 200. The access point 200 is configured to include a controller 201, a storage 202, and a communication unit 203.

The controller 201 is an arithmetic unit which is responsible for control to be performed by the access point 200. The controller 201 can be implemented by an arithmetic processing device, such as a CPU.

The controller 201 is configured to have two functional modules, an information transmission unit 2011 and an information retransmission unit 2012. The functional modules may be implemented through execution of a program stored in auxiliary memory by the CPU.

The information transmission unit 2011 acquires, from the server apparatus 400, data to be broadcast-transmitted to the plurality of vehicle-mounted apparatuses 100 connected to the predetermined wireless network and controls transmission of the data. For example, if there is a network to which the vehicle 10 located near a given intersection can connect, safety of the vehicle that is to pass through the intersection can be enhanced by broadcast-transmitting data related to a traffic situation of the intersection to the vehicle 10 connected to the wireless network.

In the present embodiment, an IP packet generated by the server apparatus 400 is broadcast-transmitted to all of the vehicle-mounted apparatuses 100 connected to the target wireless network. A destination address set in a header of the IP packet is a broadcast address for all the apparatuses included in the target wireless network.

The information retransmission unit 2012 determines that there is a data block unsuccessfully received by any vehicle-mounted apparatus 100 among a series of data blocks which are broadcast-transmitted to the plurality of vehicle-mounted apparatuses 100 and retransmits the data block. A specific method will be described later.

The storage 202 is configured to include a main memory and an auxiliary memory. The main memory is a memory into which a program to be executed by the controller 201 and data to be used by the control program are loaded. The auxiliary memory is a device in which the program to be executed in the controller 201 and the data to be used by the control program are stored.

The communication unit 203 is a communication interface for connecting the access point 200 to the network. The communication unit 203 is configured to include a wireless communication interface for wireless connection to the vehicle-mounted apparatuses 100 and a wired communication interface for connection to the WAN.

Note that the configurations illustrated in FIGS. 2 and 4 are examples and that all or some of the illustrated functions may be executed using a specifically designed circuit. Program storage or execution may be performed by a combination of a main memory and an auxiliary memory other than the illustrated ones.

A method by which the access point 200 that acquires data from the server apparatus 400 broadcast-transmits the data to the vehicle-mounted apparatuses 100 will be described in more detail.

Figure 5:
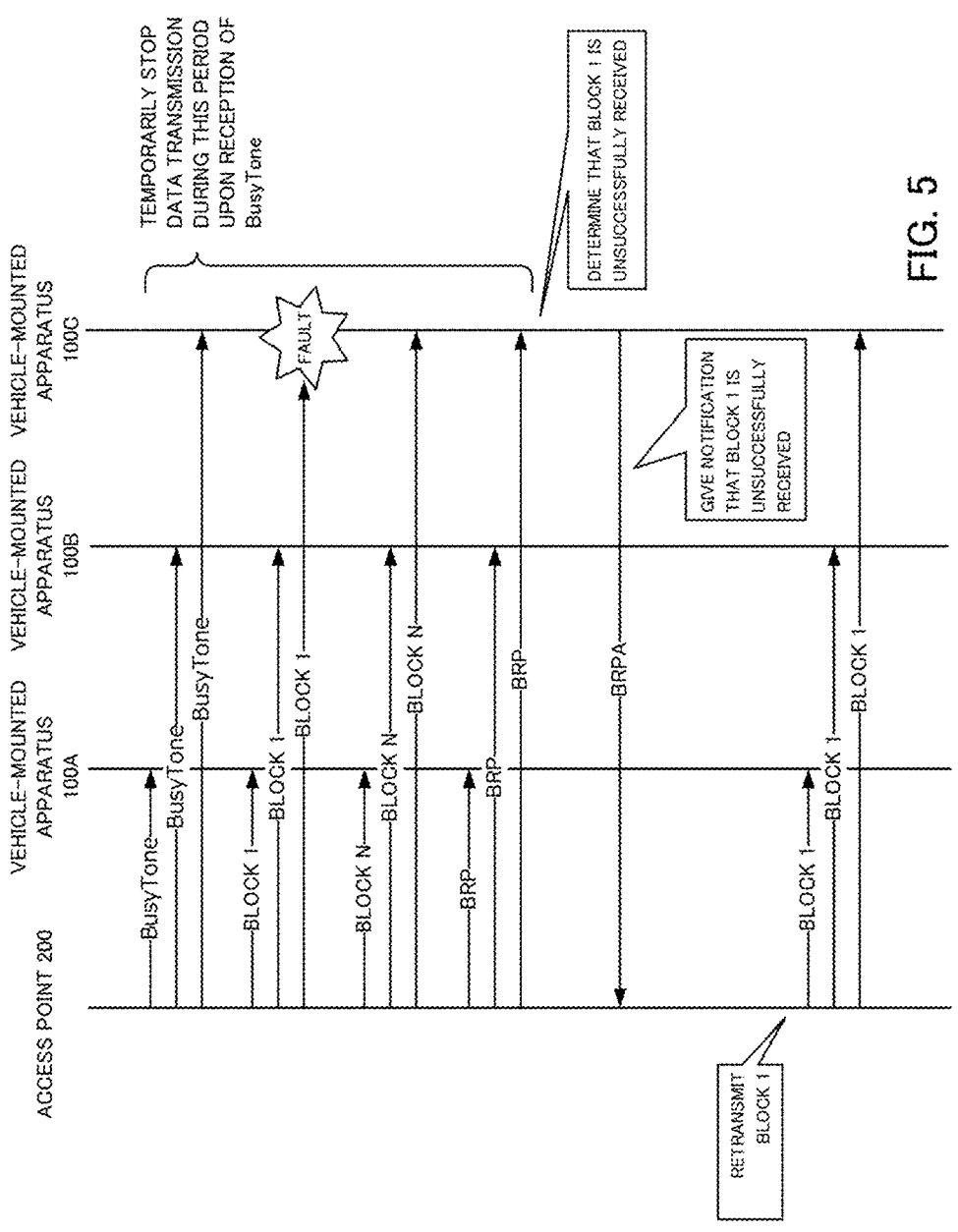
FIG. 5 is a sequence chart for explaining a data transmission method.

FIG. 5 is a sequence chart of a process in which the access point 200 broadcast-transmits data to the vehicle-mounted apparatuses 100. In the present example, three vehicle-mounted apparatuses 100A, 100B, and 100C are given as an example of the plurality of vehicle-mounted apparatuses 100.

First, the access point 200 (the information transmission unit 2011) transmits a signal (a BusyTone signal hereinafter referred to as a BT signal) for asking for temporary stopping of data transmission to the plurality of vehicle-mounted apparatuses 100.

In a wireless communication standard using a CSMA/CA scheme, a plurality of terminals listens to a channel after waiting for a random backoff time period, at the time of data transmission. That is, there is no mechanism for preferentially transmitting data from a given apparatus to another apparatus. For this reason, the present embodiment adopts a configuration in which the access point 200 transmits a BT signal to the target wireless network, and the vehicle-mounted apparatuses 100 that receive the BT signal temporarily stop data transmission. Sending-out of the BT signal is preferably performed in an extremely short time period in order to avoid a conflict with different communication.

When the vehicle-mounted apparatus 100 receives a BT signal, the vehicle-mounted apparatus 100 shifts to a mode (hereinafter referred to as a reception mode) of stopping data transmission until the vehicle-mounted apparatus 100 receives a BRP (to be described later).

When the access point 200 transmits a BT signal, the access point 200 initiates broadcast transmission of data. Data transmission is performed by successively transmitting a plurality of data blocks. Note that a sequence number is assigned to each of the plurality of data blocks, as illustrated in FIG. 3. The sequence number indicates the total number of data blocks intended to be transmitted and an ordinal position of current data.

The vehicle-mounted apparatus 100 records a sequence number with each reception of data. For this reason, even if there is an unsuccessfully received data block, the vehicle-mounted apparatus 100 can know an ordinal position of missing data. Assume, in the illustrated example, that the vehicle-mounted apparatus 100C has unsuccessfully received a first data block.

When the transmission of the series of data blocks is completed, the access point 200 generates a notification (Broadcast Retransmission Polling hereinafter referred to as a BRP) for causing the vehicle-mounted apparatus 100 to declare that there is an unsuccessfully received data block and broadcast-transmits the notification.

The vehicle-mounted apparatus 100 that receives the BRP refers to recorded sequence numbers and determines presence or absence of an unsuccessfully received data block. In the present example, the vehicle-mounted apparatus 100C is determined unsuccessful in receiving the first data block.

The vehicle-mounted apparatus 100 unsuccessful in receiving a data block transmits a notification (Broadcast Retransmission Polling Ack hereinafter referred to as a BRPA) to the effect that there is an unsuccessfully received data block to the access point 200 in response to the BRP. A sequence number of the unsuccessfully received data block is included in the BRPA.

When the access point 200 receives a BRPA, the access point 200 retransmits a data block with a declared sequence number. For example, if a data set composed of a plurality of data blocks is to be transmitted a plurality of times, a data block with a declared sequence number may be retransmitted at a next or subsequent transmission timing. In the present example, the first data block is broadcast-transmitted again prior to next or subsequent data transmission.

Flowcharts of processes to be executed by the vehicle-mounted apparatus 100 and the access point 200 will be described.

Figure 6:
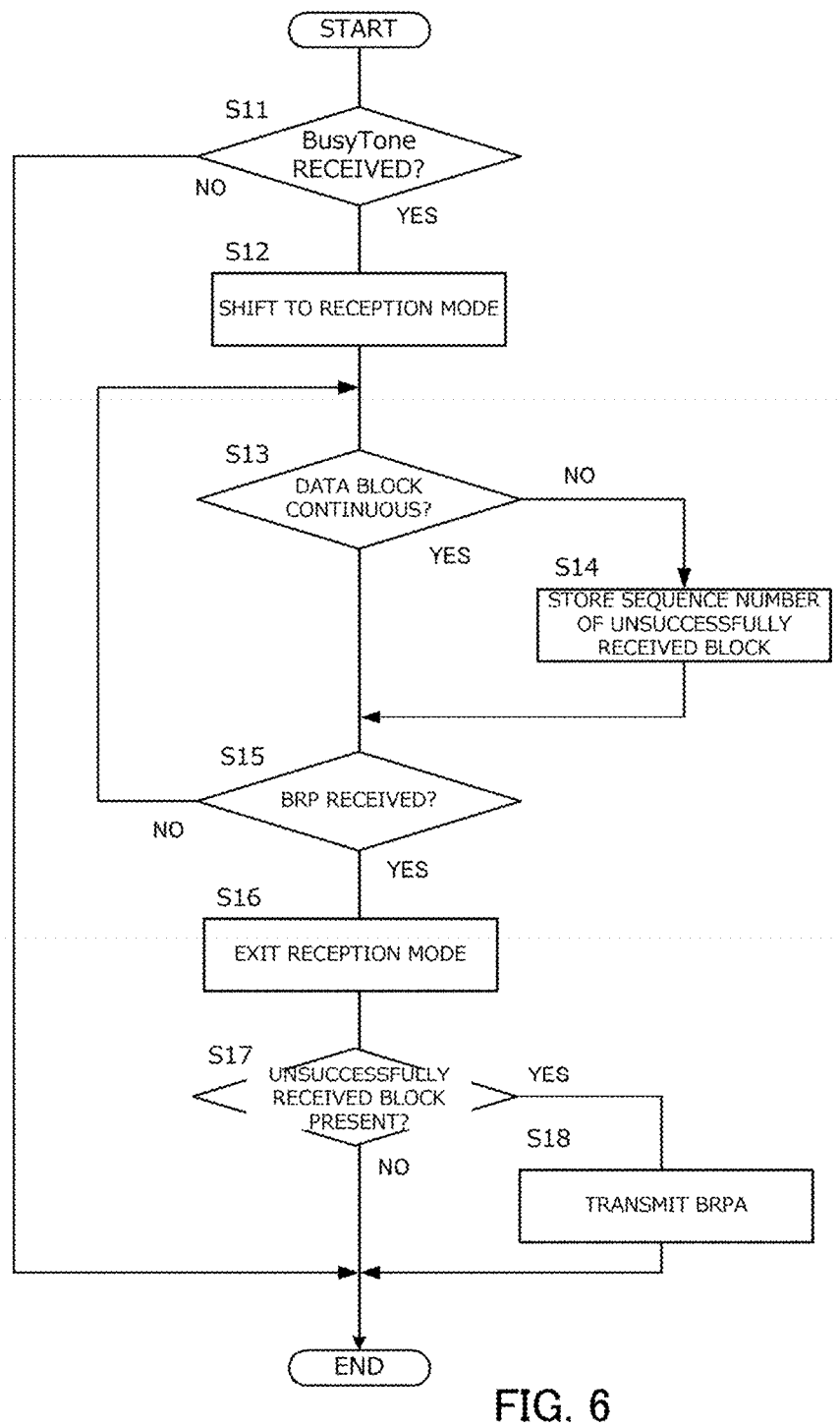
FIG. 6 is a flowchart of a process to be performed by the vehicle-mounted apparatus.

FIG. 6 is a flowchart of a process to be executed by the vehicle-mounted apparatus 100. The illustrated process is repeatedly executed in a state of waiting for reception.

First, in step S11, it is determined whether a BT signal is received from the access point 200. If a BT signal is received, the process shifts to step S12. If no BT signal is received, the process ends.

In step S12, a mode of the vehicle-mounted apparatus 100 is switched to the reception mode. After the shift to the reception mode, data transmission from the vehicle-mounted apparatus 100 is temporarily stopped.

In step S13, a broadcast-transmitted data block is received, and it is determined whether data blocks received to date are all continuous. If there is data block with discontinuous sequence numbers among the successively received data blocks, this indicates that the data block is unsuccessfully received. If there is an unsuccessfully received data block, the process shifts to step S14 to store a sequence number of the data block.

In step S15, it is determined whether a BRP is received from the access point 200. If no BRP is received, the process returns to step S13 to continue the data block reception. If a BRP is received, the process shifts to step S16 to exit the reception mode.

In step S17, it is determined whether a sequence number of an unsuccessfully received data block is stored. If there is an unsuccessfully received data block, the process shifts to step S18 to generate a BRPA including a sequence number of the data block and transmit the BRPA to the access point 200.

Figure 7:
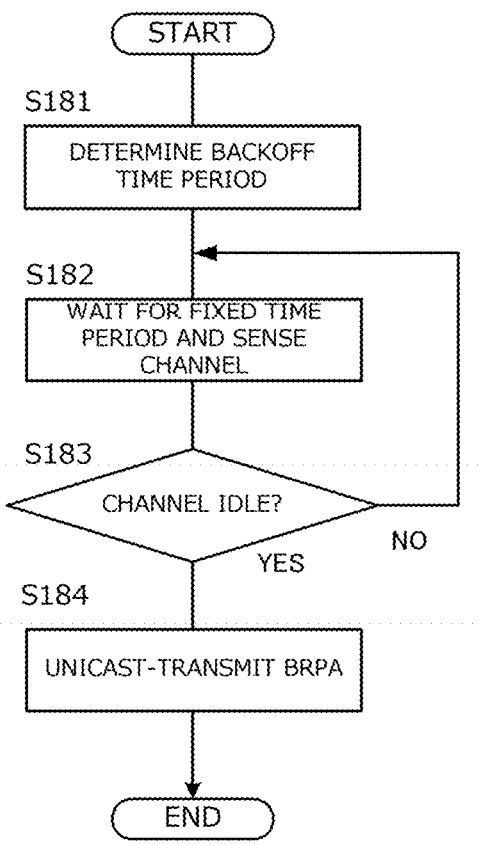
FIG. 7 is a flowchart of a process to be performed by the vehicle-mounted apparatus.

FIG. 7 is a flowchart illustrating details of the process in step S18.

First, in step S181, a random backoff time period is determined.

In step S182, the process waits for a fixed time period (DIFS). The DIFS is a time period to when no signal is detected from a channel in a busy state any longer, and it is determined that the channel has shifted to an idle state.

In step S183, it is determined whether the channel is in the idle state. If the channel is in the idle state, the process shifts to step S184 to transmit a BRPA to the access point 200 by unicasting. If the channel is not in the idle state, the process returns to step S182.

With the above-described process, a BRPA is transmitted from the vehicle-mounted apparatus 100 to the access point 200.

Figure 8:
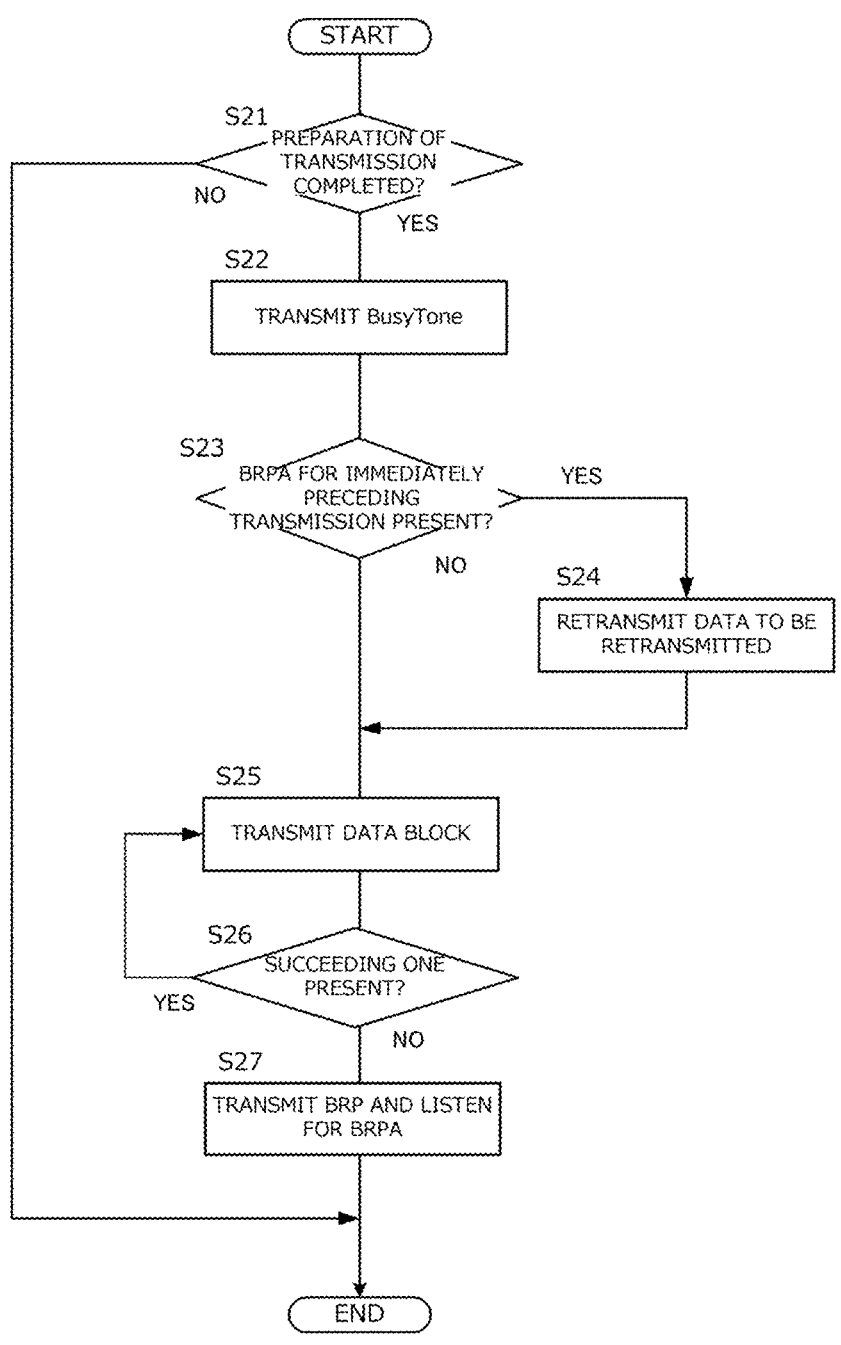
FIG. 8 is a flowchart of a process to be performed by the access point.

A flowchart of a process to be executed by the access point 200 will be described. FIG. 8 is a flowchart of the process to be executed by the access point 200.

First, in step S21, it is determined whether preparation of data to be broadcast-transmitted to the plurality of vehicle-mounted apparatuses 100 is completed. If the preparation of the data to be broadcast-transmitted is completed, and transmission is initiated, the process shifts to step S22.

In step S22, the information transmission unit 2011 generates a BT signal and broadcast-transmits the BT signal to the vehicle-mounted apparatuses 100 in the target wireless network.

Figure 9:
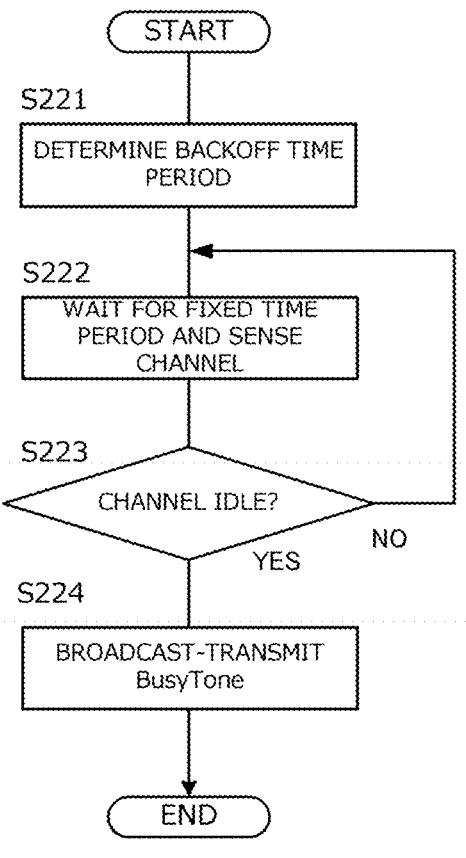
FIG. 9 is a flowchart of a process to be performed by the access point.

FIG. 9 is a flowchart illustrating details of the process in step S22.

First, in step S221, a random backoff time period is determined.

In step S222, the process waits for a fixed time period (DIFS).

In step S223, it is determined whether the channel is in the idle state. If the channel is in the idle state, the process shifts to step S224 to transmit a BT signal to the plurality of vehicle-mounted apparatuses 100 by broadcasting. If the channel is not in the idle state, the process returns to step S222.

With the above-described process, a BT signal is transmitted from the access point 200 to the vehicle-mounted apparatuses 100.

In next step S23, it is determined whether there is a BRPA received at the time of immediately preceding data transmission. If there is a BRPA received at the time of the immediately preceding data transmission, this means that data retransmission is necessary. In this case, the process shifts to step S24 to broadcast-transmit a data block to be retransmitted (i.e., a data block with a sequence number indicated by the BRPA).

In step S25, a plurality of data blocks which are to be transmitted are sequentially broadcast-transmitted. When a data block is transmitted, presence or absence of a succeeding data block is determined in step S26. If there is a succeeding data block, the process returns to step S25 to continue the broadcast transmission.

When the transmission of the plurality of data blocks is completed, in step S27, a BRP is broadcast-transmitted, and listening for a BRPA which is transmitted from the vehicle-mounted apparatus 100 is performed. If a BRPA is received, step S24 is executed in a next cycle, and a target data block is retransmitted. Note that a BRPA is not transmitted from any vehicle-mounted apparatus 100, the process is completed upon occurrence of a timeout.

As has been described above, in the communication system according to the first embodiment, the access point 200 transmits a notification (BRP) for causing the plurality of vehicle-mounted apparatuses 100 to transmit a negative acknowledgment after broadcast-transmitting a plurality of data blocks to the plurality of vehicle-mounted apparatuses 100.

With the above-described configuration, since only a vehicle-mounted apparatus unsuccessful in data reception transmits a negative acknowledgment (retransmission request), communication overhead can be reduced.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a Floppy® disk, a hard disk drive (HDD) and the like) and an optical disc (a CD-ROM, a DVD disc, a Blu-ray disc and the like), a read-only memory (ROM), a random-access memory (RAN), an EPROM, an EEPROM, a magnetic card, a flash memory, an optical card, and a medium of a given type that is appropriate for storing electronic commands are included.

What is claimed is:

1. A wireless communication apparatus for transmitting data to a plurality of terminals in conformity with a predetermined wireless communication standard, the wireless communication apparatus comprising a controller configured to execute:

successively broadcast-transmitting a plurality of data blocks;

broadcast-transmitting first notification data as a notification for causing a first terminal receiving at least a part of the plurality of data blocks to declare that there is an unsuccessfully received data block after completion of transmission of the plurality of data blocks; and retransmitting, if second notification data indicating the unsuccessfully received data block is received as a response to the first notification data from one or more of the first terminals, the data block indicated by the second notification data, wherein the controller broadcast-transmits a signal giving notice of initiation of the transmission of the plurality of data blocks before initiating the broadcast-transmitting of the plurality of data blocks.

2. The wireless communication apparatus according to claim 1, wherein the second notification data includes a sequence number of the unsuccessfully received data block.

3. The wireless communication apparatus according to claim 2, wherein the controller broadcast-transmits only the data block with the sequence number included in the second notification data of the plurality of data blocks again in order to perform the retransmitting.

4. The wireless communication apparatus according to claim 1, wherein the signal is a signal asking the plurality of terminals to temporarily stop data transmission.

5. The wireless communication apparatus according to claim 1, wherein the signal is a signal asking the plurality of terminals to temporarily stop data transmission until reception of the first notification data.

6. The wireless communication apparatus according to claim 1, wherein the predetermined wireless communication standard is IEEE802.11aa.

7. A wireless communication system, comprising:

a first wireless communication apparatus and a second wireless communication apparatus, wherein the first wireless communication apparatus executes receiving a plurality of data blocks which are broadcast-transmitted in conformity with a predetermined wireless communication standard by the second wireless communication apparatus, receiving, from the second wireless communication apparatus, first notification data as a notification for causing the first wireless communication apparatus to declare that there is an unsuccessfully received data block, the first notification data being broadcast-transmitted after completion of transmission of the plurality of data blocks, and transmitting, if the first wireless communication apparatus unsuccessfully receives any of the plurality of data blocks, second notification data indicating the unsuccessfully received data block to the second wireless communication apparatus, in response to the first notification data, the second wireless communication apparatus executes successively broadcast-transmitting the plurality of data blocks, broadcast-transmitting the first notification data after completion of the transmission of the plurality of data blocks, and retransmitting, if the second notification data is transmitted as a response to the first notification data from the first wireless communication apparatus, the data block indicated by the second notification data, and the second wireless communication apparatus broadcast-transmits a signal giving notice of initiation of the transmission of the plurality of data blocks before initiating the broadcast-transmitting of the plurality of data blocks.

8. The wireless communication system according to claim 7, wherein the first wireless communication apparatus records, if the first wireless communication apparatus unsuccessfully receives any of the plurality of data blocks, a sequence number of the data block, and transmits the second notification data including the sequence number.

9. The wireless communication system according to claim 8, wherein the second wireless communication apparatus broadcast-transmits only the data block with the sequence number included in the second notification data of the plurality of data blocks again in order to perform the retransmitting.

10. The wireless communication system according to claim 7, wherein the first wireless communication apparatus temporarily stops data transmission if the first wireless communication apparatus receives the signal.

11. The wireless communication system according to claim 7, wherein the first wireless communication apparatus temporarily stops data transmission until reception of the first notification data if the first wireless communication apparatus receives the signal.

12. The wireless communication system according to claim 7, wherein the predetermined wireless communication standard is IEEE802.11aa.

13. A wireless communication method to be performed by a first wireless communication apparatus and a second wireless communication apparatus, wherein the first wireless communication apparatus executes receiving a plurality of data blocks which are broadcast-transmitted in conformity with a predetermined wireless communication standard by the second wireless communication apparatus, receiving, from the second wireless communication apparatus, first notification data as a notification for causing the first wireless communication apparatus to declare that there is an unsuccessfully received data block, the first notification data being broadcast-transmitted after completion of transmission of the plurality of data blocks, and transmitting, if the first wireless communication apparatus unsuccessfully receives any of the plurality of data blocks, second notification data indicating the unsuccessfully received data block to the second wireless communication apparatus, in response to the first notification data, the second wireless communication apparatus executes successively broadcast-transmitting the plurality of data blocks, broadcast-transmitting the first notification data after completion of the transmission of the plurality of data blocks, retransmitting, if the second notification data is transmitted as a response to the first notification data from the first wireless communication apparatus, the data block indicated by the second notification data, and the second wireless communication apparatus further executes a step of broadcast-transmitting a signal giving notice of initiation of the transmission of the plurality of data blocks before initiating the broadcast-transmitting of the plurality of data blocks.

14. The wireless communication method according to claim 13, wherein the first wireless communication apparatus further executes a step of recording, if the first wireless communication apparatus unsuccessfully receives any of the plurality of data blocks, a sequence number of the data block, and transmits the second notification data including the sequence number.

15. The wireless communication method according to claim 14, wherein the second wireless communication apparatus further executes a step of broadcast-transmitting only the data block with the sequence number included in the second notification data of the plurality of data blocks again in order to perform the retransmission.

16. The wireless communication method according to claim 13, wherein the first wireless communication apparatus temporarily stops data transmission if the first wireless communication apparatus receives the signal.

17. The wireless communication method according to claim 13, wherein the first wireless communication apparatus temporarily stops data transmission until reception of the first notification data if the first wireless communication apparatus receives the signal.

* * * * *